(No Model.)
C. CUTTRISS.
THERMOSTATIC ALARM.
No. 522,972. Patented July 17, 1894.
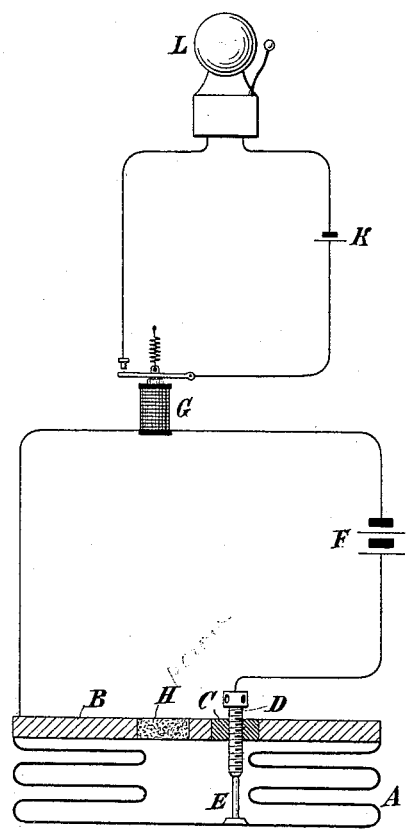
Witnesses:
Raphaël Netter
James N. Catlow
Inventor
Charles Cuttriss
by Duncan & Page,
Attorneys

UNITED STATES PATENT OFFICE.

CHARLES CUTTRISS, OF NEW YORK, N. Y.

THERMOSTATIC ALARM.

SPECIFICATION forming part of Letters Patent No. 522,972, dated July 17, 1894.

Application filed October 26, 1893. Serial No. 489,186. (No model.)

*To all whom it may concern:*

Be it known that I, CHARLES CUTTRISS, a subject of the Queen of Great Britain, residing at New York, in the county and State of New York, have invented certain new and useful Improvements in Thermostatic Alarms, of which the following is a specification, reference being had to the drawing accompanying and forming a part of the same.

In what are known as automatic fire alarm systems, it is usual to place at different points in a building thermostatic devices which when affected by a predetermined temperature will operate to close, or more commonly to open an electric circuit including a battery and suitable indicating or alarm mechanism. The thermostats usually employed have been of such character as to remain inactive through all variations of temperature whether sudden or gradual up to the normal limit for which they are adjusted. This feature is a serious drawback in many instances and detracts very greatly from the value and efficiency of all automatic systems of this kind. For example, in any building which is not artificially heated, at least to any material extent, but in which the temperature is approximately determined by the natural conditions of the outside atmosphere, very wide variations of temperature may occur. In some climates this may be from the freezing point or even much lower in winter, to 100° or over in the hot days of summer, so that a fire which at one season would have to raise the temperature only a comparatively few degrees, might at another have to produce a change of perhaps one hundred or more degrees before making its influence felt by the thermostat. Again, should a fire occur in an apartment at some distance from a thermostat, it must raise the temperature of a considerable body of air surrounding it and including the thermostat to a predetermined degree before giving the alarm. Thus, it is constantly happening that a fire starting in an area protected by thermostatic alarms, acquires such headway before making itself known that the supposed advantage of the thermostatic system is entirely destroyed. A condition, however, almost universally attendant upon the ignition of combustibles in an inclosed chamber, without regard to the actual temperature existing at the time, is a sudden or abnormal rate of increase of temperature, and various devices have been proposed with the object of providing a thermostat capable of indicating such abnormal variations, without being affected by any gradual or normal changes of temperature below a predetermined limit.

My invention resides in an improvement in thermostats of this character, the object being to produce a simple and reliable device acting on this principle. For this purpose I construct a thermostat dependent for operation upon the expansion of a medium such as, and preferably air contained therein, but in which provision is made for a slow escape or influx of the air. These conditions being secured, it is evident that any expansion of the confined air which increases its volume more rapidly than the leakage can compensate for, will result in the operation of the device, without regard to the actual degree of temperature from which the rise took place. I also arrange the device so that the expansion of its component parts under the influence of a predetermined temperature will cause it to operate independently of the internal air pressure within it.

The invention in a practical and convenient form is illustrated in the accompanying drawing.

The figure represents in central vertical section a thermostat which in general construction is similar to those heretofore used.

A represents an ordinary sheet metal drum or case with deep circumferential corrugations. This case is closed at the top by a metal plate or head B, in which is set in an insulating bushing C, an adjustable contact screw D. Beneath the screw and soldered or fixed to the bottom of the device is a conducting pin or stud E. A circuit is made from the metal case to the insulated screw D, and includes a battery F and the magnet G of a relay controlling the circuit of a battery K containing an alarm bell L.

In the head B, or in any channel through the same, I insert a small body of porous material H, such as a section of the unglazed earthenware used for battery jars, or in any other way provide a leak, or retarded passage for a slow escape and influx of the air or other medium within the device. The dimensions and character of the porous material are readily determined, according to the rate of expansion which it is proposed to make compensation for.

In practice I have adjusted the leak or breathing hole as it may be termed so that a variation of temperature of 1° a minute will not produce a separation of the points of contact. Such a variation, while hardly possible from natural causes, might reasonably be expected to be exceeded by almost any fire that would be likely to occur in the neighborhood of a thermostat. Any source of artificial heat, therefore, that would cause a rise of temperature around such a thermostat, at a rate greater than 1° a minute would produce an expansion of air within the instrument and sound the alarm, by producing an elongation of the case.

Ordinarily, in such devices, the screw D is adjusted so that the expansion of the confined air produced by a given temperature will separate the contact points and ring the alarm. In my improved apparatus I adjust this screw so that the elongation or distortion of the corrugated chamber due to the expansion of the metal at a given temperature, for example 120°, will separate the contact points, so that however gradual the rise of temperature may be, the instrument will always be brought into operation when the temperature has reached or exceeded a given limit.

The invention is not limited to the specific construction herein shown, but

What I regard as within my invention and claim is—

1. A thermostatic circuit-controller operated by the expansion of a medium confined in a chamber or receptacle due to rise in temperature and constructed or provided with a passage or vent from the said chamber to the external air for such escape or influx of said medium as will neutralize the effects of natural or normal changes of temperature upon the thermostat as set forth.

2. A thermostatic circuit-controller dependent for operation upon the expansion of a confined body of air, and provided with an outlet closed by a porous substance, as set forth.

3. A thermostatic circuit-controller consisting of the combination of a metallic case capable of distortion or change of shape under varying temperatures and also under the influence of the expansion of a body of air confined therein and provided with a restricted passage for the escape and influx of air, of contact points secured respectively to two points of the case which are displaced by its distortion or change of shape, as set forth.

CHARLES CUTTRISS.

Witnesses:
PARKER W. PAGE,
FREDERICK S. DUNCAN.